(12) United States Patent
Connolly et al.

(10) Patent No.: US 6,350,968 B1
(45) Date of Patent: Feb. 26, 2002

(54) METHOD AND APPARATUS FOR RAPID HEAT-UP OF A GLASS-CERAMIC COOKTOP

(75) Inventors: Allan John Connolly, Albany; Austars Raymond Schnore, Jr., Scotia, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/687,112

(22) Filed: Oct. 16, 2000

(51) Int. Cl.[7] ............................... H05B 1/02; H05B 3/68
(52) U.S. Cl. ................................ 219/497; 219/448.11
(58) Field of Search ..................... 219/481, 482, 219/490, 492, 494, 497, 509, 510, 448.11, 448.12

(56) References Cited

U.S. PATENT DOCUMENTS

| | | |
|---|---|---|
| 4,493,980 A | 1/1985 | Payne et al. |
| 4,692,596 A | 9/1987 | Payne |
| 4,740,664 A * | 4/1988 | Payne et al. ............ 219/448.12 |
| 5,293,028 A | 3/1994 | Payne |
| 5,352,866 A * | 10/1994 | Cartwright et al. .......... 219/497 |
| 5,582,756 A * | 12/1996 | Koyama ...................... 219/497 |
| 5,603,772 A * | 2/1997 | Ide ............................. 118/724 |
| 5,793,022 A * | 8/1998 | Klinck et al. ................ 219/483 |
| 6,018,150 A * | 1/2000 | Maher, Jr. .................... 219/497 |

* cited by examiner

Primary Examiner—Sang Paik
(74) Attorney, Agent, or Firm—John F. Thompson; Jill M. Breedlove

(57) ABSTRACT

An apparatus for rapidly heating a cooktop is provided. The apparatus comprises a radiant heating element positioned proximate to the cooktop. A controller is provided and is connected to the radiant heating element. The controller includes a fast heat-up circuit selectively coupled to the radiant heating element. A look-up table is selectively coupled to the fast heat-up circuit. The look-up table comprises a plurality of user power levels. Each of the plurality of user power levels is correlated to a respective user-selected temperature. The apparatus further comprises a user power input device connected to the controller. The user power input device also allows selection of at least a first of the plurality of user power levels wherein the first power level corresponds to a first respective user selected temperature in the look-up table. A temperature sensor is connected to the controller for measuring a temperature of the cooktop.

25 Claims, 4 Drawing Sheets

METHOD AND APPARATUS FOR RAPID HEAT-UP OF A GLASS-CERAMIC COOKTOP

BACKGROUND OF THE INVENTION

The present invention relates to controlling power supplied to a radiant heating element in a cooktop and more particularly to controlling power supplied to the radiant heating element such a glass-ceramic cooktop rapidly heats to a desired temperature.

Electronically controlled cooktops includes various user controls that are operated by a user to adjust the amount of heat and, ultimately, the temperature desired for cooking. A radiant heating element used for heating the cooktop can be powered by electricity, natural gas or other sources. Typically, the radiant heating element and the user controls are connected to a controller that controls the amount of heat supplied to the cooktop. The electronically controlled cooktop also includes temperature and other sensor that are connected to the controller to aid in controlling the heat supplied by the radiant heating source. The temperature and other sensors can also be used in conjunction with the controller to detect certain conditions that can arise during operation of the cooktop.

The user controls can include a user power selection device wherein the user can select a power level from, for example, a plurality of power levels. The user selected power level is supplied to a radiant heating element that heats the cooktop to a predetermined temperature that corresponds to the user selected power level. Typically, the user selected power level is provided to the radiant heating element at a constant, non-varying power level. This constant application of the user selected power level requires a predetermined amount of time before the radiant heating element heats the cooktop to the predetermined temperature corresponding to the user selected power level. Using this application of power at all user selected power levels, the predetermined time required to heat the cooktop can be high causing the user to become frustrated during the cooking process. Therefore, there is a desire to quickly heat the cooktop and to reduce the predetermined time required for heating such as to enhance the cooking experience for the user.

In addition, certain radiant heating elements, such as for example, electric coil-type elements, desire to have an oxide coating produced on the radiant heating element to increase the operational properties of the radiant heating element. Operating the radiant heating element at a high power level for a short period of time can typically, produce such an oxide coating. In addition, since the oxide layer can breakdown over time, the radiant heating element should be periodically operated at the high power level to maintain the oxide coating. Therefore, there is a desire to periodically operate the radiant heating element at a high power level for a short period of time to produce and maintain an oxide layer on the radiant heating element. In addition, there is a further desire to enhance the user's cooking experience while also periodically operating the radiant heating element at a high power level.

BRIEF SUMMARY OF THE INVENTION

In one exemplary embodiment, an apparatus for rapidly heating a cooktop is provided. The apparatus comprises a radiant heating element this is positioned below the cooktop. A controller is connected to the radiant heating element. The controller comprises a first switching device that is connected to the radiant heating element. A fast heat-up circuit is connected to the first switching device. The fast heat-up circuit comprises a proportional-plus-integral (PI) controller connected to the first switching device. The fast heat-up circuit also comprises a minimum selector having a minimum selector output. The minimum selector is connected to the PI controller, and the minimum selector output is connected to the first switching device. In addition, the fast heat-up circuit also comprises an anti-wind up controller that is connected to the PI controller and the minimum selector output. The controller further comprises a second switching device that is connected to the PI controller, and a look-up table that is connected to the second switching. The look-up table comprises a plurality of user power levels. Each of the plurality of user power levels is correlated to a respective user-selected temperature. The apparatus further comprises a user power input device that is connected to the controller and that allows selection of at least a first of the plurality of user power levels. The first user power level corresponds to a first respective user-selected temperature in the look-up table. Additionally, the apparatus comprises a temperature sensor that is connected to the controller to measure a temperature of the cooktop.

In another exemplary embodiment, a method for rapidly heating a cooktop is provided. The method comprises the steps of selecting a user power level using a user input device. The user power level corresponding to a respective user-selected temperature. A temperature of the cooktop is measured using a temperature sensor. The measured temperature is compared to the respective user-selected temperature. The respective user-selected temperature is supplied to a proportional-plus-integral (PI) controller when the measured temperature is less than about the respective user-selected temperature. The PI controller is connected to the radiant heating element when the measured temperature is less than about the respective user-selected temperature. A predetermined maximum temperature is supplied to the PI controller when the measured temperature is greater than about the respective user-selected temperature. A fast heat-up circuit is connected to the radiant heating element when the measured temperature is greater than about the respective user-selected temperature. A predetermined maximum temperature is supplied to the PI controller when the measured temperature is substantially equal to about the respective user-selected temperature. A fast heat-up circuit is connected to the radiant heating element when the measured temperature is substantially equal to about the respective user-selected temperature.

DETAILED DESCRIPTION OF THE INVENTION

Figure 1:
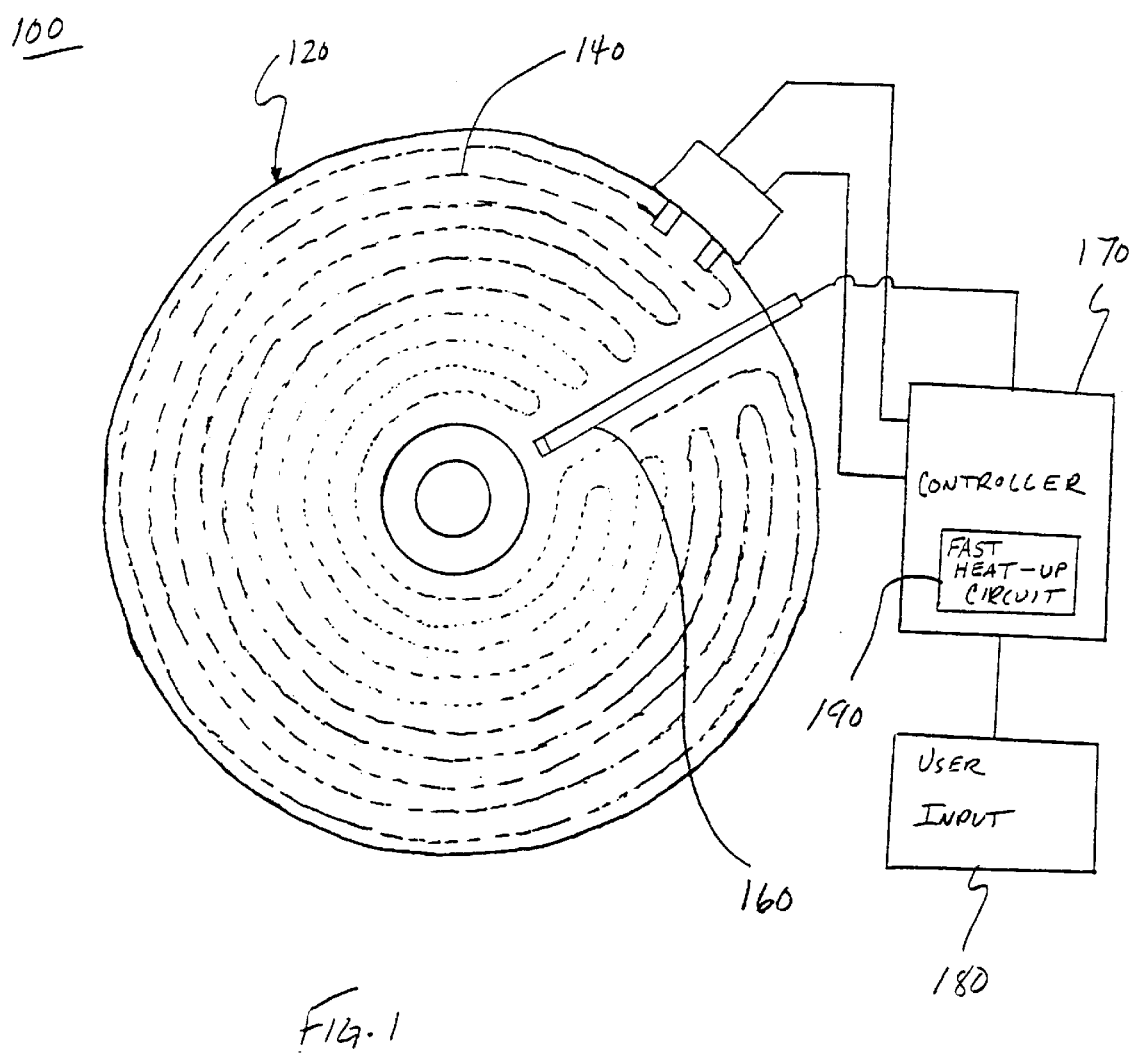
FIG. 1 is a top view and a block diagram view of one exemplary embodiment of an electronically controlled cooktop.

As shown in FIG. 1, one exemplary embodiment of an electronically controlled cooktop 100 includes a cooktop 120. In one embodiment, the cooktop 120 is composed of glass ceramic. The cooktop 120 is positioned proximate to a radiant heating element 140. In this embodiment, the proximate positioning of the radiant heating element 140 comprises a position below the cooktop 120. In other embodiments, the proximate positioning comprises a position on, near, inside or above the cooktop 120. A cooking utensil (not shown) can be positioned on the cooktop 120 or, in another embodiment, the radiant heating element 140. A temperature sensor 160 is provided to sense the temperature in or near the cooktop 120. In one embodiment, the temperature sensor 160 is positioned proximate to the cooktop 120. In another embodiment, the temperature sensor 160 is positioned inside the cooktop 120. It should be appreciated that in one embodiment, the temperature sensor 160 comprises an acoustic sensor that measures the temperature of the cooktop 120. It should also be appreciated that, in other embodiments, the temperature sensor 160 can comprise, for example, a contact sensor, a rod sensor, a thermocouple, a thermistor or any other sensor that can directly or indirectly measure the temperature of the cooktop 120. In one embodiment, a measured temperature ($T_{meas}$) of the cooktop 120 is determined by the placement of the temperature sensor 160. The measured temperature ($T_{meas}$) can actually be measured at a predetermined distance from the cooktop 120 and the measured temperature ($T_{meas}$) may be less than the actual temperature of the cooktop 120. In addition in other embodiments, the temperature sensor 160 can measure the actual temperature of the cooktop 120, therefore, the measured temperature ($T_{meas}$) will be equal to the actual temperature of the cooktop 120. Thus, based on the temperature sensor 160 and/or the placement of the temperature sensor 160, a predetermined maximum temperature ($T_{max}$) can change from embodiment to embodiment based on the temperature being measured by the temperature sensor 160. The predetermined maximum temperature ($T_{max}$) comprises a maximum temperature that the cooktop 120 should operate to maximize the performance of the electronically controlled cooktop 100.

A controller 170 is connected to the temperature sensor 160 and receives the measured temperature ($T_{meas}$) of the cooktop 120. A user input interface 180 is connected to the controller 170. The user input interface 180 contains various pre-selected power settings (not shown) so that a user can select a desired power level (user input power level ($P_{UI}$)) such that the cooktop 120 heats to a temperature desired by the user during the cooking process. The controller 170 is also connected to the radiant heating element 140. The controller 170 includes a fast heat-up circuit 190 that receives the measured temperature ($T_{meas}$) from the temperature sensor 160 and user input power level ($P_{UI}$) from the user input interface 180. The fast heat-up circuit 190 provides a output power ($P_{CMD}$) to the radiant heating element 140 such that the cooktop 120 heats to the desired user temperature quickly. To quickly heat the cooktop 120, the fast heat-up circuit 190 applies a maximum power level to the radiant heating element 140 for an amount of time until the desired user temperature is attained.

It should be appreciated that the electronically controlled cooktop 100 can include a plurality of radiant heating elements 140 and a separate controller 170 for each of the plurality of radiant heating elements 140. In addition, the user input interface 180 can also be connected to each of the plurality of radiant heating elements 140. It should also be appreciated that in other embodiments the electronically controlled cooktop 100 can include other power controllers (not shown) and/or signal processing devices (not shown) connected to, at least, the radiant heating element 140, the temperature sensor 160 and other various sensors (not shown). These other power controllers (not shown) and/or signal processing devices (not shown) perform signal processing and other controlling of the power levels supplied to the radiant heating element 140 based on other factors and/or dynamics in the electronically controlled cooktop 100 during the cooking/heating process.

In another embodiment, the electronically controlled cooktop 100 can also comprises a power controller (not shown) that is connected between the controller 170 and the radiant heating element 140. The power controller (not shown) can adjust the output power ($P_{CMD}$) to a discreetly quantized or continuous power level and can supply the power level to the radiant heating element 140. In one embodiment, the power controller (not shown) comprises a quantizer that uses cycle skipping to supply power to the radiant heating element 140. The cycle skipping allows the quantizer to provide a plurality of quantization levels, such as, for example, a number of quantization levels greater than two. In another embodiment, the power controller (not shown) can comprise a continuous power output rather than discreetly quantized power output levels. In even another embodiment, the power controller (not shown) comprises a linear controller or any other power output device to provide power to the radiant heating element 140. In addition, it should also be appreciated that, in one embodiment, the power controller (not shown) is not included in the electronically controlled cooktop 100 and the controller 170 provides a power output to the radiant heating element 140. Additionally, the power controller (not shown) can be implemented via hardware, software or algorithm implemented in hardware or software, and in another embodiment, the power controller (not shown) may be included externally from the controller 170.

Figure 2:
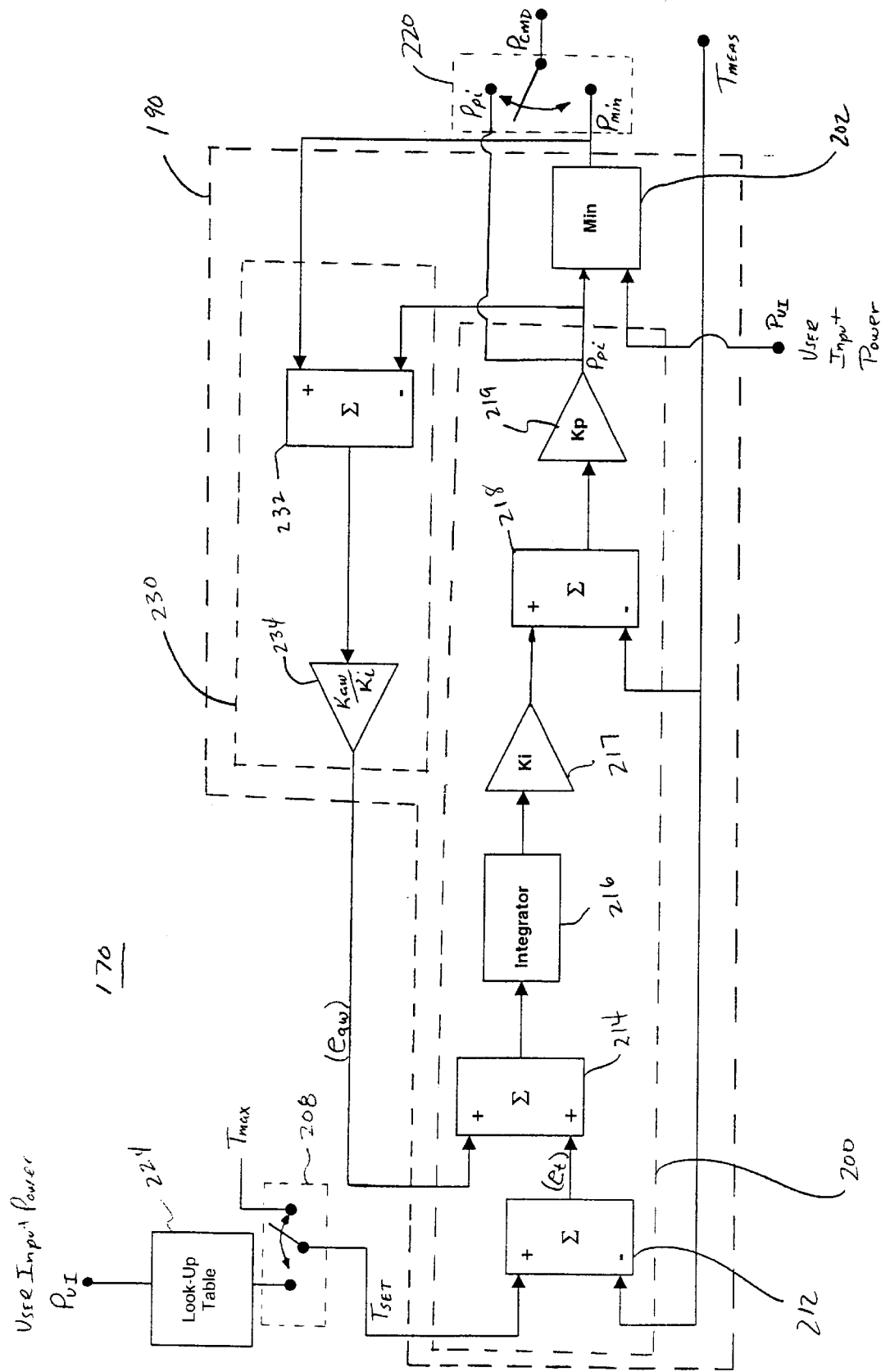
FIG. 2 is a block diagram of one exemplary embodiment of a controller including a fast heat-up circuit.

In one embodiment shown in FIG. 2, the controller 170 comprises a fast heat-up circuit 190 that includes a proportional-plus-integral (PI) controller 200 connected to an anti-wind up controller 230. The PI controller 200 is connected to a minimum selector 202. The PI controller 200 comprises a first summer 212 connected to a second switching device 208, and the first summer 212 receives the measured temperature ($T_{meas}$) of the cooktop 120. The first summer 212 subtracts the measured temperature ($T_{meas}$) from the second switching device output ($T_{set}$) and the output ($e_t$) is provided to a second summer 214. An anti-wind up error output ($e_{aw}$) is also supplied to the second summer 214, and the second summer 214 adds the output ($e_t$) from the first summer 212 to the anti-wind up error output ($e_{aw}$). The anti-wind up error output ($e_{aw}$) is a feedback output level resulting from the comparison of the minimum selector output ($P_{min}$) and the proportional-plus-integral (PI) power output ($P_{pi}$). The output from the second summer 214 is supplied to an integrator 216 that integrates the second summer 214 output signal. The output from the integrator 216 is supplied to an integrator amplifier 217 having a gain of $K_i$ (integral gain) that comprises a predetermined gain level. The output from the integrator amplifier 217 is connected to a third summer 218 that subtracts the measured temperature ($T_{meas}$) from the output of the integrator amplifier 217. The output of the third summer 218 is supplied to an output amplifier 219 having a gain of $K_p$ (proportional gain) that comprises a predetermined gain level. The output from the output amplifier 219 is the PI power output ($P_{pi}$) from the PI controller 200. The minimum selector 202 receives the PI power output ($P_{pi}$) and the user input power ($P_{UI}$) from the user input interface 180. The minimum selector 402 supplies the smaller of the PI power output ($P_{pi}$) and the user input power ($P_{UI}$) as a minimum selector power output ($P_{min}$) to a first switching device 220.

In addition, the PI power output ($P_{pi}$) is supplied to the first switching device 220.

The anti-wind up controller 230 comprises an anti-wind up summer 232 connected to an anti-wind up amplifier 234. The anti-wind up summer 232 receives the PI power output ($P_{pi}$) and the minimum selector power output ($P_{min}$) and subtracts the PI power output ($P_{pi}$) from the minimum selector power output ($P_{min}$). The output of the anti-wind up summer 232 is supplied to the anti-wind up amplifier 234 having gain ($K_{aw}/K_i$) that is a predetermined anti-wind up gain ($K_{aw}$) divided by the predetermined integrator gain ($K_i$) (integral gain). The gain ($K_{aw}/K_i$) of the anti-wind up amplifier 234 is a predetermined gain level. The output of the anti-wind up amplifier 234 comprises the anti-wind up error output ($e_{aw}$) that is supplied to the second summer 214 of the PI controller 200. It should be appreciated that, in other embodiments, the anti-wind up controller 230 can be located outside the controller 170. It should also be appreciated that, in one embodiment, the temperature values and power levels described herein and shown in FIGS. 1–4 are voltage signals representative of the temperatures and/or power output levels. Therefore, the summation, amplification, integration and other operations, as shown in FIG. 2, are manipulations of these voltage signals that represent the temperature and power output levels. Also, it should be appreciated that the manipulation of the voltage signals can be performed via hardware or via software and/or an algorithm implemented in hardware or software.

As described herein above, the fast heat-up circuit 190 receives the inputs of the second switching device output ($T_{set}$) predetermined maximum temperature ($T_{max}$), the user input power level ($P_{UI}$) and the measured temperature ($T_{meas}$) of the cooktop 120. Using these inputs, the fast heat-up circuit 190 operates to control the output power ($P_{CMD}$) such that, in one aspect, a maximum of the measured temperature ($T_{meas}$) of the cooktop 120 reaches about the predetermined maximum temperature ($T_{max}$). In another aspect, the fast heat-up circuit 190 receives the second switching device output ($T_{set}$), the user power ($P_{UI}$) and the measured temperature ($T_{meas}$) of the cooktop 120 such that the radiant heating element 140 quickly heats to a steady state temperature ($T_{ss(x)}$) (FIGS. 3 and 4 wherein "x" represents the level of the selected user input power ($P_{UI}$)) via application of a maximum power level for an amount of time. In one embodiment, the predetermined maximum ($T_{max}$) is programmed and/or stored in a memory device (not shown) and is supplied to the controller 170.

Also shown in FIG. 2, the fast heat-up circuit 190 is connected to the second switching device 208 and the first switching device 220. The second switching device 208 is connected to a look-up table 224 and the predetermined maximum temperature ($T_{max}$) signal. The second switching device output ($T_{set}$) is connected to the PI controller 200. The first switching device 220 is connected to the PI power output ($P_{pi}$) from the PI controller 200 and the minimum selector power output ($P_{min}$) from the fast heat-up circuit 190 and the output power ($P_{CMD}$) is connected in one embodiment to the radiant heating element 140. The second switching element 208 and the first switching element 220 receive their respective inputs and can be instructed to toggle by the controller 170 between the respective inputs based on predetermined criteria. It should be appreciated that the second switching device 208 and the first switching device 220 can comprise hardware-type switches and/or a logic circuit. In addition, it should also be appreciated that the second switching device 208 and the first switching device 220 can be implemented in software or via an algorithm. In the software/algorithm embodiment, the respective inputs are supplied to the software and/or algorithm and a respective output is generated based on predetermined criteria. It should also be appreciated that the second switching element 208 and the first switching element 220 can be located, in one embodiment, together or individually within the controller 170. In another embodiment, the second switching element 208 and the first switching element 220 can be together or individually located externally from the controller 170.

The look-up table 224, in FIG. 2, is connected to the user input interface 180 or receives the user input power ($P_{UI}$) and is connected to the second switching device 208. In one embodiment, the look-up table 224 comprises a database or list of user input power ($P_{UI}$) levels that are individually correlated to a respective steady state temperature ($T_{ss(x)}$) wherein the user input power ($P_{UI}$) level is represented by "x". The steady state temperature ($T_{ss(x)}$) is a temperature that the cooktop will heat to at the selected user power input ($P_{UI}$) level, and the user selected power level ($P_{UI}$) is represented by "x" on the user input interface 180. In one embodiment, the look-up table 224 can comprise software or an algorithm. In another embodiment, the look-up table 224 resides in a memory device (not shown). In even another embodiment, the look-up table 224 is comprises in software or an algorithm that receives and converts the user input power ($P_{UI}$) to a steady state temperature ($T_{ss(x)}$) value. It should be appreciated that, in one embodiment, the look-up table 224 can be located externally from the controller 170. In another embodiment, the look-up table can be located internally to the controller 170.

Figure 3:
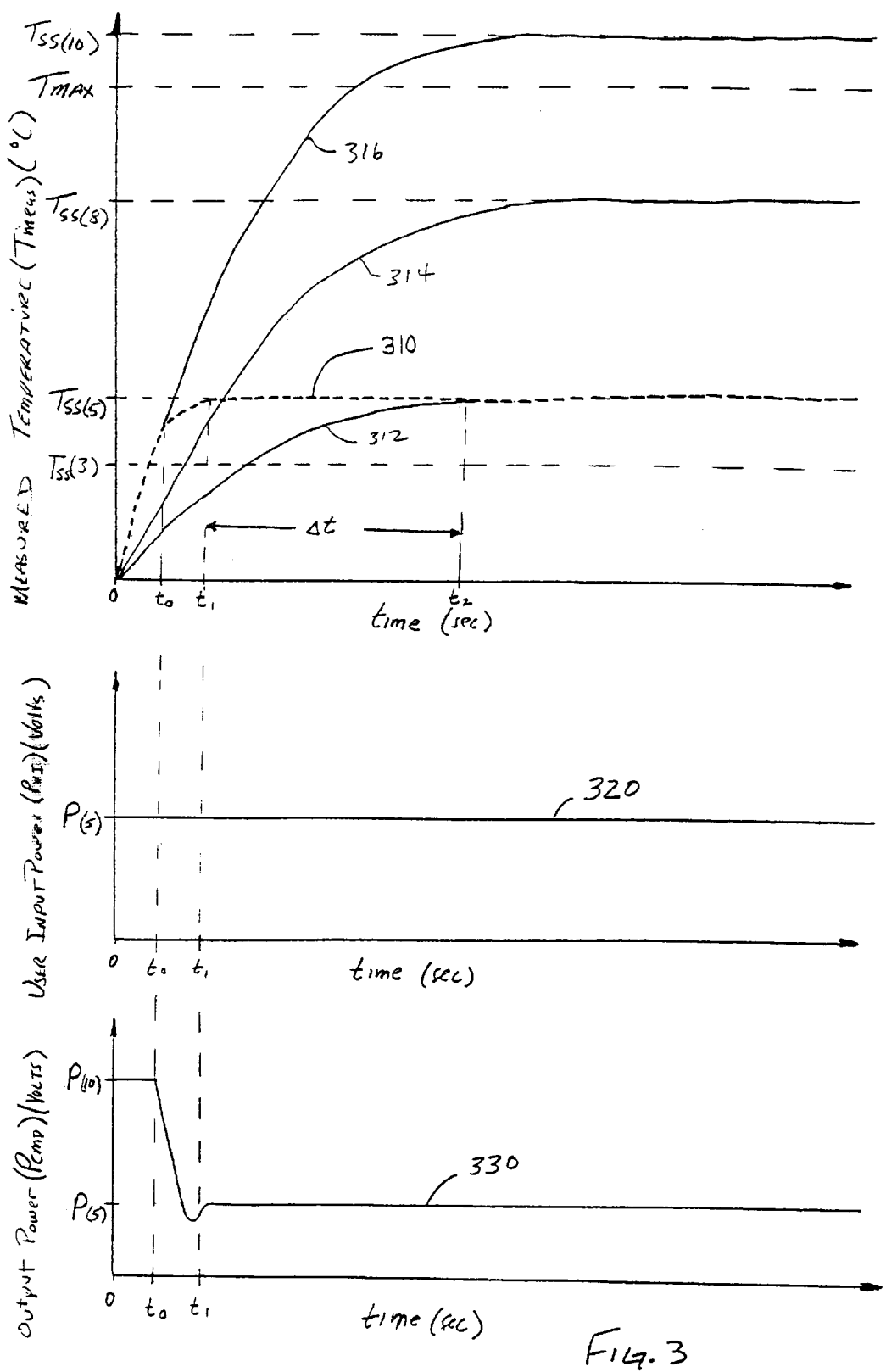
FIG. 3 includes graphs illustrating cooktop temperature over time and various power outputs over time.

In FIG. 3, the measured temperature ($T_{meas}$) of the cooktop 120 versus time (plot 310) shows a typical temperature profile of the electronically controlled cooktop 100 as a user sets the user input interface 180 to power level five ($P_5$). Also, in FIG. 3, the measured temperature ($T_{meas}$) versus time graph also shows a user power level five curve (plot 312), a user power level eight curve (plot 314) and a user power level ten curve (plot 316). The power level five, eight and ten curves (plots 312, 314 and 316, respectively) show a measured temperature ($T_{meas}$) profile of the electronically controlled cooktop 100 where the user input power ($P_{UI}$) equals the output power ($P_{CMD}$). For the user power level five curve (plot 312), the output power would ($P_{CMD}$) constantly equal about the user power level five ($P_5$) (plot 320). For the user power level eight curve (plot 314), the output power ($P_{CMD}$) would constantly equal about user power level ($P_8$) (not shown). For the user power level ten curve (plot 316), the output power ($P_{CMD}$) would constantly equal about user power level ten ($P_{10}$) (not shown). The user power level five, eight and ten curves (plots 312, 314 and 316, respectively) are plots of the measured temperature ($T_{meas}$) in a cooktop that does not incorporate a fast heat up circuit 190. Additionally in FIG. 3, the user input power ($P_{UI}$) versus time (plot 320) shows an exemplary user input power ($P_{UI}$) that is constantly held at power level five ($P_5$).

In FIG. 3, the output power ($P_{CMD}$) versus time (plot 330) shows the output power generated by the controller 170 and applied to the radiant heating element 140. The output power ($P_{CMD}$) (plot 330) is manipulated by the fast heat-up circuit 190 to allow the cooktop 120 to rapidly heat to a desired temperature ($T_{ss(5)}$) in FIG. 3 by applying a maximum power level for an amount of time.

In the embodiment shown in FIG. 3, the user has selected power level five ($P_5$) on the user input interface 180. The user input power ($P_{UI}$), in this embodiment power level five ($P_5$), is supplied to the look-up table 224 and the minimum selector 202. The look-up table 224 correlates the power level five ($P_5$) to steady state temperature five ($T_{ss(5)}$). The controller 170 compares the measured temperature ($T_{meas}$) to the steady state temperature five ($T_{ss(5)}$). In this embodiment, the measured temperature is less than about the steady state temperature five ($T_{ss(5)}$). Therefore, the controller 170 instructs the second switching device 208 to toggles to the look-up table 224 such that the steady state temperature five ($T_{ss(5)}$) is supplied as the second switching device output ($T_{set}$) to the PI controller 200. In addition, based on the same criteria, the controller 170 instructs the first switching device 220 to toggle to the PI controller 200 and supply the PI power output ($P_{pi}$) as the output power ($P_{CMD}$) applied to the radiant heating element 140.

When the PI controller 200 receives steady state temperature five ($T_{ss(5)}$) as the second switching device output ($T_{set}$) from the second switching device 208, the PI controller 200 applies the maximum power output ($P_{10}$) as the output power ($P_{CMD}$) to the radiant heating element 140. As shown in plot 310, the measured temperature ($T_{meas}$) tracks the user power level ten curve (plot 316) for an amount of time. After which, the PI controller 200 progressively lowers the output power ($P_{CMD}$) until the measured temperature ($T_{meas}$) equals about the steady state temperature five ($T_{ss(5)}$). As shown in plot 310, the measured temperature ($T_{meas}$) departs from power level ten curve (plot 316) and beings to track to steady state temperature five ($T_{ss(5)}$). It should be appreciated that the transition of the measured temperature ($T_{meas}$) and the output power ($P_{CMD}$) between times $t_0$ and $t_1$ is controlled by the selection of the integral gain ($K_i$) of the integration amplifier 217 and the proportional gain ($K_p$) of the output amplifier 219. The choice of the values for the integral gain ($K_i$) and the proportional gain ($K_p$) will affect the values at which the measured temperature ($T_{meas}$) transitions, the values at which the output power ($P_{CMD}$) transitions and the times at which the output power ($P_{CMD}$) transitions. It should be appreciated that in other embodiments the maximum power level may be a power level higher or lower than the user power level ten ($P_{10}$), and the choice of the maximum power level is based on specific criteria in the design of the electronically controlled cooktop 100.

Also, shown in FIG. 3, if the user power level five ($P_5$) had been constantly applied to the radiant heating element 140, the cooktop 120 would take until time $t_2$ to reach steady state temperature five ($T_{ss(5)}$). However, since the PI controller 200 applies the maximum temperature ($P_{10}$) for an amount of time, the cooktop 120 heats to steady state temperature ($T_{ss(5)}$) at time $t_1$. The time, $\Delta t$ represents a time that the PI controller saves the user during cooking because the cooktop 120 heats quicker than if the user power level five ($P_5$) had been constantly applied to the radiant heating element 140. Once the measured temperature ($T_{meas}$) is equal to or less than the steady state temperature five ($T_{ss(5)}$), the controller 170 instructs the second switching device 208 to toggle to the predetermined maximum temperature ($T_{meas}$) and the first switching device 220 toggles to the minimum selector output ($P_{min}$). At this time, the controller 170 begins to thermally limit the measured temperature ($T_{meas}$) such that a maximum measured temperature of the cooktop 120 equals about the predetermined maximum temperature ($T_{max}$).

Figure 4:
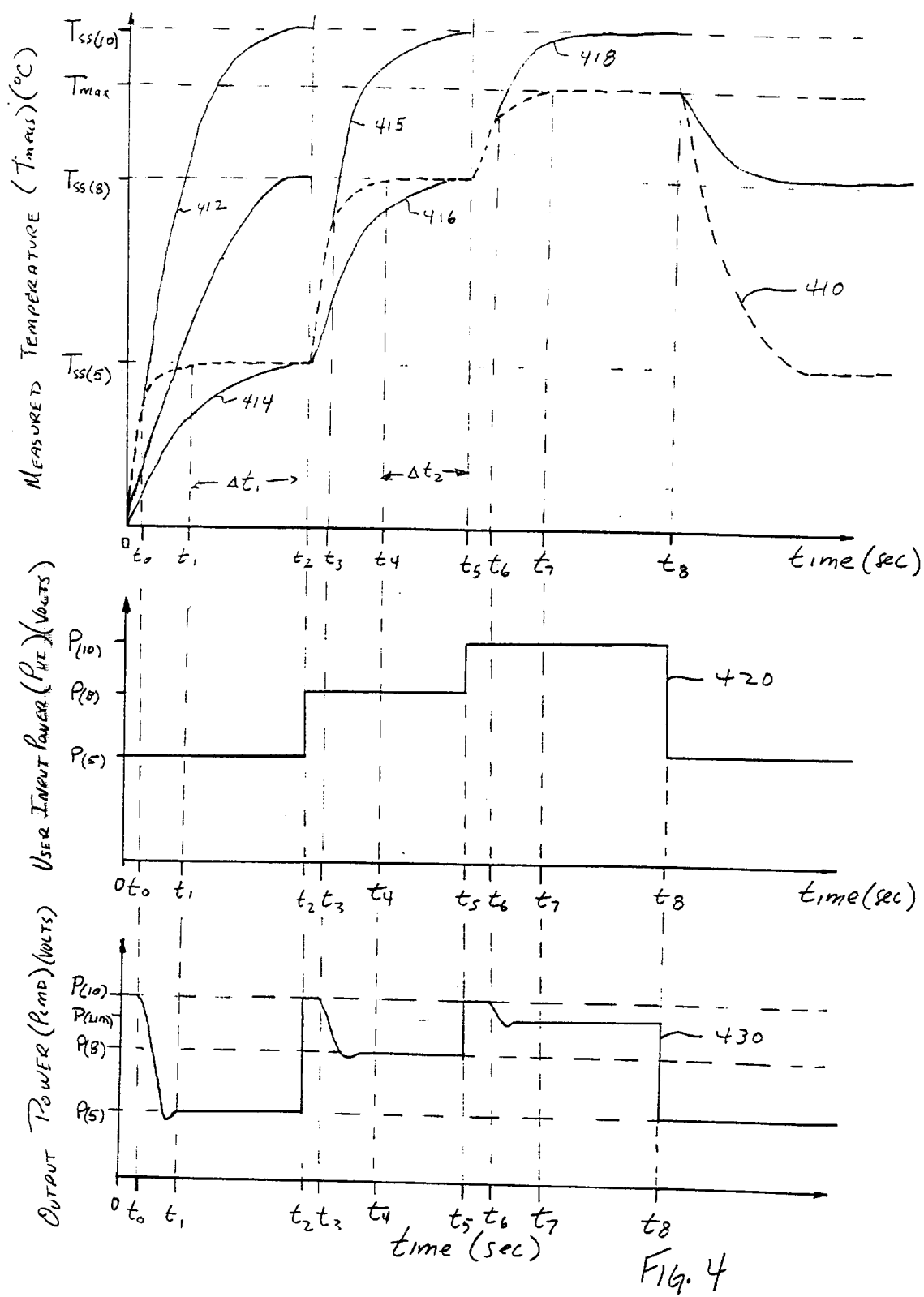
FIG. 4 includes additional graphs illustrating cooktop temperature over time and various power outputs over time.

In FIG. 4, the measured temperature ($T_{meas}$) of the cooktop 120 versus time (plot 410) shows a typical temperature profile of the electronically controlled cooktop 100 as a user adjusts the input power via the user input interface 180. Additionally, in FIG. 4, the user input power level ($P_{UI}$) versus time (plot 420) shows an exemplary user power input that switches between various power levels over time. Also shown in FIG. 4, the output power ($P_{CMD}$) versus time (plot 430) shows the output power ($P_{CMD}$) that is applied to the radiant heating element 140 in response to the user input power ($P_{UI}$).

As shown in plot 420, the user selects power level five ($P_5$) via the user input interface 180. Power level five ($P_5$) is supplied to the look-up table 224 that correlates power level five ($P_5$) to the steady state temperature five ($T_{ss(5)}$). The controller 170 compares the measured temperature ($T_{meas}$) to the steady state temperature five ($T_{ss(5)}$). At this time, the measured temperature ($T_{meas}$) is less than the steady state temperature five ($T_{ss(5)}$). Therefore, the controller instructs the second switching device 208 to toggle to the look-up table 224 and supplies the steady state temperature five ($T_{ss(5)}$) as the second switching device output ($T_{set}$) to the PI controller 200. In addition based on the same criteria, the controller 170 also instructs the first switching device 220 to toggle to the PI power output ($P_{pi}$) such that the PI power output ($P_{pi}$) is the output power ($P_{CMD}$) supplied to the radiant heating element 140. The PI controller 200 controls the PI power output ($P_{pi}$) such that the maximum power ($P_{10}$) is supplied for an amount of time and that the cooktop 120 heats to steady state temperature five ($T_{ss(5)}$) quicker than if power level five ($P_5$) was constantly applied to the radiant heating element 140. As shown by plot 410, the measured temperature ($T_{meas}$) follows the power level ten curve (plot 412) and then is controlled via the PI controller 200 to reach steady state temperature five ($T_{ss(5)}$) in less time ($\Delta t_1$) than if the measured temperature ($T_{meas}$) had tracked the power level five curve (plot 414).

After the measured temperature ($T_{meas}$) becomes substantially equal to the temperature supplied to the PI controller 200 via the second switching device output ($T_{set}$) (in this case steady state temperature five ($T_{ss(5)}$), the controller 170 instructs the second switching device 208 to toggle to the predetermined maximum temperature ($T_{max}$) which is supplied to the PI controller 200 as the second switching device output ($T_{set}$). In addition based on the same criteria, the controller 170 also instructs the first switching device 220 to toggle to the minimum selector output ($P_{min}$). Switching the second switching device 208 and the first switching device 220 to this configuration allows the controller 170 to thermally limit the output power ($P_{CMD}$) such that the a maximum temperature of the cooktop 120 reaches about the predetermined maximum temperature ($T_{max}$).

As shown in plot 420 at time $t_2$, the user increases the user input power ($P_{UI}$) to power level eight ($P_8$) via the user input interface 180. After being changed, the user input power ($P_{UI}$) is supplied to the look-up table 224. Thus, the power level eight ($P_8$) is supplied to the look-up table 224 and is correlated to steady state temperature eight ($T_{ss(8)}$). The controller 170 compares the measured temperature ($T_{meas}$) to the steady state temperature eight ($T_{ss(8)}$). Since the steady state temperature eight ($T_{ss(8)}$) is greater than the measured temperature ($T_{meas}$) but not greater than the predetermined maximum temperature ($T_{max}$), the controller 170 instructs the second switching device 208 to toggle to the look-up table 224 and the first switching device 220 is instructed by the controller 170 to toggle to the PI power output ($P_{pi}$). Thus, the second switching device 208 supplies the steady state temperature eight ($T_{ss(8)}$) as the second switching device output ($T_{set}$) to the PI controller 200. As shown in plot 430, the PI controller 200 applies the maximum power ($P_{10}$) for an amount of time, and the cooktop 120 heats to steady state temperature eight ($T_{ss(8)}$) quicker than if power level eight ($P_8$) was constantly applied to the radiant heating element 140 (plot 416). As shown by plot 410, the measured temperature ($T_{meas}$) follows the second power level ten curve (plot 415) and then is controlled via the PI controller 200 to reach steady state temperature eight ($T_{ss(8)}$) in less time ($\Delta t_2$) than if the measured temperature ($T_{meas}$) had tracked a power level eight curve (plot 416).

After the measured temperature ($T_{meas}$) becomes substantially equal to the temperature supplied to the PI controller 200 via the second switching device output ($T_{set}$) (in this case steady state temperature eight ($T_{ss(8)}$), the controller 170 instructs the second switching device 208 to toggle to the predetermined maximum temperature ($T_{max}$) which is supplied to the PI controller 200 as the second switching device output ($T_{set}$). In addition based on the same criteria, the controller 170 also instructs the first switching device 220 to toggle to the minimum selector output ($P_{min}$). Switching the second switching device 208 and the first switching device 220 to this configuration allows the controller 170 to thermally limit the output power ($P_{CMD}$) such that the maximum temperature of the cooktop 120 reaches about the predetermined maximum temperature ($T_{max}$).

As shown in plot 420, at time $t_5$, a user increases the user input power ($P_{UI}$) to a power level ten ($P_{10}$) via the user input interface 180. After being changed, the user input power ($P_{UI}$) is again supplied to the look-up table 224. Thus, the power level ten ($P_{10}$) is supplied to the look-up table 224 that correlates the power level ten ($P_{10}$) to steady state temperature ten ($T_{ss(10)}$). The controller 170 compares the measured temperature ($T_{meas}$) to the steady state temperature ten ($T_{ss(10)}$). However, since the steady state temperature ten ($T_{ss(10)}$) is greater than the predetermined maximum temperature ($T_{max}$), the controller instructs the second switching device 208 to toggle to the predetermined maximum temperature ($T_{max}$). The second switching device 208 supplies the predetermined maximum temperature ($T_{max}$) as the second switching element output ($T_{set}$) to the PI controller 200. In addition, based on the same criteria, the controller 170 instructs the first switching device 220 to toggle to the minimum selector output ($P_{min}$).

As shown in the output power ($P_{CMD}$) versus time graph (plot 430), the output power ($P_{CMD}$) is equivalent to the user input power level ($P_{UI}$), in this case power level ten ($P_{10}$) at time $t_5$. At the time $t_6$, the PI power output ($P_{pi}$) becomes lower than the user input power ($P_{UI}$) and the minimum selector 202 switches the minimum selector output ($P_{min}$) to the PI power output ($P_{pi}$), and thus, the output power ($P_{CMD}$) becomes equal to the PI power output ($P_{pi}$). This power level change lowers the output power ($P_{CMD}$) as shown in plot 430 of FIG. 4 at time $t_6$ and ensures that a maximum of the measured temperature ($T_{meas}$) of the cooktop 120 reaches about the predetermined maximum temperature ($T_{max}$). As shown in plot 410, the lowering of the output power ($P_{CMD}$) causes the measured temperature ($T_{meas}$) of the cooktop 120 to stabilize to about the predetermined maximum temperature ($T_{max}$) rather than tracking to the third power level ten curve (plot 418) to reach steady state temperature ten ($T_{ss(10)}$).

The controller 170 and fast heat-up circuit 190 via the minimum selector 202 make a transition in the output power ($P_{CMD}$) from the user input power level ($P_{UI}$) to the PI power output ($P_{pi}$). This power transition is seamless and devoid of any thermal spikes and unreasonable variation/drift/overshoot in the measured temperature ($T_{meas}$) of the cooktop 120 does not occur. The operation of the controller 170 and the fast heat-up circuit 190 is seamless because the anti-wind up controller 230 allows the PI controller 200 to track the measured temperature ($T_{meas}$) rather than winding up to a maximum integral value. If the PI controller 200 was allowed to wind up to the maximum integral value, the measured temperature ($T_{meas}$) could overshoot or exceed the predetermined maximum temperature ($T_{max}$) beyond accepted tolerances before the power level was tracked to the thermally limited PI output power ($P_{pi}$).

At time $t_8$, the user input power level ($P_{UI}$) is reduced to power level five ($P_5$). At this time, the look-up table 224 correlates the power level five ($P_5$) to the steady state temperature five ($T_{ss(5)}$). The controller 170 also compares the measured temperature ($T_{meas}$) to the steady state temperature five ($T_{ss(5)}$). Since the measured temperature ($T_{meas}$) is greater than the steady state temperature five ($T_{ss(5)}$), the controller 170 instructs the second switching device 208 to toggle to the maximum temperature ($T_{max}$), and the controller 170 also instructs the first switching device 220 to toggle to the minimum selector output ($P_{min}$). The second switching device 208 provides the predetermined maximum temperature ($T_{max}$) as the second switching device output ($T_{set}$) to the PI controller 200. The first switching device 220 supplies the minimum selector output ($P_{min}$) as the output power ($P_{CMD}$). Since the measured temperature ($T_{meas}$) is greater than the steady state temperature five ($T_{ss(5)}$), the output power ($P_{CMD}$) is equivalent to the user input power level ($P_{UI}$), in this case power level five ($P_5$) as shown in plots 420 and 430. Since the output power ($P_{CMD}$) is kept at power level five ($P_5$), the measured temperature ($T_{meas}$) (plot 410) shows that cooktop 120 is allowed to cool to steady state temperature five ($T_{ss(5)}$) without any further manipulation of the output power ($P_{CMD}$). It should be appreciated that the changes at times $t_2$, $t_5$ and $t_8$ of the user input power level ($P_{UI}$) are exemplary acts by the user to change the user power input ($P_{UI}$) using the user input interface 180.

The foregoing discussion of the invention has been presented for purposes of illustration and description. Further, the description is not intended to limit the invention to the form disclosed herein. Consequently, variations and modifications commensurate with the above teachings, with the skill and knowledge of the relevant art, are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. An apparatus for rapidly heating a cooktop, the apparatus comprising:
   a radiant heating element positioned below the cooktop;
   a controller connected to the radiant heating element, the controller comprising:
   a first switching device connected to the radiant heating element;
   a fast heat-up circuit connected to the first switching device, the fast heat-up circuit comprising:
   a proportional-plus-integral (PI) controller connected to the first switching device;
   a minimum selector having a minimum selector output, the minimum selector connected to the PI controller and the minimum selector output connected to the first switching device; and
   an anti-wind up controller connected to the PI controller and the minimum selector output;

a second switching device connected to the PI controller; and a look-up table connected to the second switching device, the look-up table comprising a plurality of user power levels wherein each of the plurality of user power levels correlates to a respective user-selected temperature;

a user power input device connected to the controller and allowing selection of at least a first of the plurality of user power levels wherein the first user power level corresponds to a first respective user-selected temperature in the look-up table; and a temperature sensor connected to the controller to measure a temperature of the cooktop.

2. The apparatus of claim 1 wherein the look-up table supplies at least the first respective user-selected temperature to the PI controller via the second switching element when the measured temperature is less than about the first respective user-selected temperature, and the controller connecting the PI controller to the radiant heating element when the measured temperature is less than about the first respective user-selected temperature.

3. The apparatus of claim 1 wherein a predetermined maximum temperature is supplied to the PI controller when the measured temperature is greater than about the first respective user-selected temperature, and the controller being connected to the radiant heating element when the measured temperature is greater than about the first respective user-selected temperature.

4. The apparatus of claim 1 wherein a predetermined maximum temperature is supplied to the PI controller when the measured temperature is substantially equal to about the first respective user-selected temperature, and the controller being connected to the radiant heating element when the measured temperature is greater than about the first respective user-selected temperature.

5. The apparatus of claim 1 wherein the temperature sensor is positioned proximate to the cooktop.

6. The apparatus of claim 1 wherein the cooktop comprises a glass ceramic cooktop.

7. The apparatus of claim 6 wherein the temperature sensor is located inside the glass ceramic cooktop.

8. The apparatus of claim 1 wherein the first switching device comprises a software program receiving and selectively providing an output from the PI controller and the minimum selector output to the radiant heating element.

9. The apparatus of claim 1 wherein the second switching device comprises a software program receiving and selectively providing the output from the look-up table and a predetermined maximum temperature to the PI controller.

10. The apparatus of claim 1 wherein the look-up table comprises a software program comprising a list of the plurality of user power levels and the respective user-selected temperatures corresponding to each of the plurality of user power levels.

11. The apparatus of claim 1 wherein the look-up table comprises a database comprising a list of the plurality of user power levels and the respective user-selected temperatures corresponding to each of the plurality of user power levels.

12. The apparatus of claim 1 wherein the look-up table comprises an algorithm comprising a list of the plurality of user power levels and the respective user-selected temperatures corresponding to each of the plurality of user power levels.

13. The apparatus of claim 1 wherein the look-up table comprises a memory device comprising a list of the plurality of user power levels and the respective user-selected temperatures corresponding to each of the plurality of user power levels.

14. A method for rapidly heating a cooktop, the method comprising the steps of:

selecting a user power level using a user input device, the user power level corresponding to a respective user-selected temperature;

measuring a temperature of the cooktop using a temperature sensor;

comparing the measured temperature to the respective user-selected temperature;

supplying the respective user-selected temperature to a proportional-plus-integral (PI) controller of a fast heat-up circuit when the measured temperature is less than about the respective user-selected temperature;

connecting the PI controller to a radiant heating element when the measured temperature is less than about the respective user-selected temperature; and applying a maximum power to the radiant heating element from the PI controller of the fast heat-up circuit for a predetermined amount of time when the measured temperature is less than about the respective user-selected temperature.

15. The method of claim 14 further comprising the steps of:

supplying a predetermined maximum temperature to the PI controller when the measured temperature is greater than about the respective user-selected temperature; and connecting a controller to the radiant heating element when the measured temperature is greater than about the user selected temperature.

16. The method of claim 15 further comprising the steps of:

supplying a predetermined maximum temperature to the PI controller when the measured temperature is substantially equal to about the respective user-selected temperature; and connecting the controller to the radiant heating element when the measured temperature is substantially equal to about the respective user-selected temperature.

17. A method for rapidly heating a cooktop, the method comprising the steps of:

selecting a user power level using a user input device, the user power level corresponding to a respective user-selected temperature;

measuring a temperature of the cooktop using a temperature sensor;

comparing the measured temperature to the respective user-selected temperature;

supplying the respective user-selected temperature to a proportional-plus-integral (PI) controller of a fast heat-up circuit when the measured temperature is less than about the respective user-selected temperature;

connecting the PI controller to the radiant heating element when the measured temperature is less than about the respective user-selected temperature;

supplying a predetermined maximum temperature to the PI controller when the measured temperature is greater than about the respective user-selected temperature;

connecting a controller to the radiant heating element when the measured temperature is greater than about the respective user-selected temperature;

supplying a predetermined maximum temperature to the PI controller when the measured temperature is substantially equal to about the respective user-selected temperature; and connecting the controller to the radiant heating element when the measured temperature is substantially equal to about the respective user-selected temperature.

18. An apparatus for rapidly heating a cooktop, the apparatus comprising:

a radiant heating element positioned proximate to the cooktop;

a controller connected to the radiant heating element, the controller comprising:

a fast heat-up circuit selectively coupled to the radiant heating element, the fast heat-up circuit comprising:

a proportional-plus-integral (PI) controller selectively coupled to at least the look-up table;

a minimum selector having a minimum selector output, the minimum selector connected to the PI controller; and an anti-wind up controller connected to the PI controller and the minimum selector output;

a look-up table selectively coupled to the fast heat-up circuit, the look-up table comprising a plurality of user power levels wherein each of the plurality of user power levels correlates to a respective user-selected temperature;

a user power input device connected to the controller and allowing selection of at least a first of the plurality of user power levels wherein the first power level corresponding to a first respective user selected temperature in the look-up table; and a temperature sensor connected to the controller for measuring a temperature of the cooktop.

19. The apparatus of claim 18 further comprising:

a first switching device connected to the radiant heating element, the minimum selector output and PI controller; a second switching device connected to the PI controller, the look-up table and a predetermined maximum temperature.

20. The apparatus of claim 19 wherein the first switching device comprises a software program receiving and selectively providing an output from the PI controller and the minimum selector output to the radiant heating element.

21. The apparatus of claim 19 wherein the second switching device comprises a software program receiving and selectively providing the output from the look-up table and a predetermined maximum temperature to the PI controller.

22. The apparatus of claim 18 wherein the look-up table comprises a software program comprising a list of the plurality of user power levels and the respective user-selected temperatures corresponding to each of the plurality of user power levels.

23. The apparatus of claim 18 wherein the look-up table comprises a database comprising a list of the plurality of user power levels and the respective user-selected temperatures corresponding to each of the plurality of user power levels.

24. The apparatus of claim 18 wherein the look-up table comprises an algorithm comprising a list of the plurality of user power levels and the respective user-selected temperatures corresponding to each of the plurality of user power levels.

25. The apparatus of claim 18 wherein the look-up table comprises a memory device comprising a list of the plurality of user power levels and the respective user-selected temperatures corresponding to each of the plurality of user power levels.

* * * * *